Dec. 23, 1958     C. A. VAN PAPPELENDAM     2,866,075
METHOD OF FABRICATING STRUCTURAL SANDWICHES
Filed Sept. 23. 1957     3 Sheets-Sheet 2

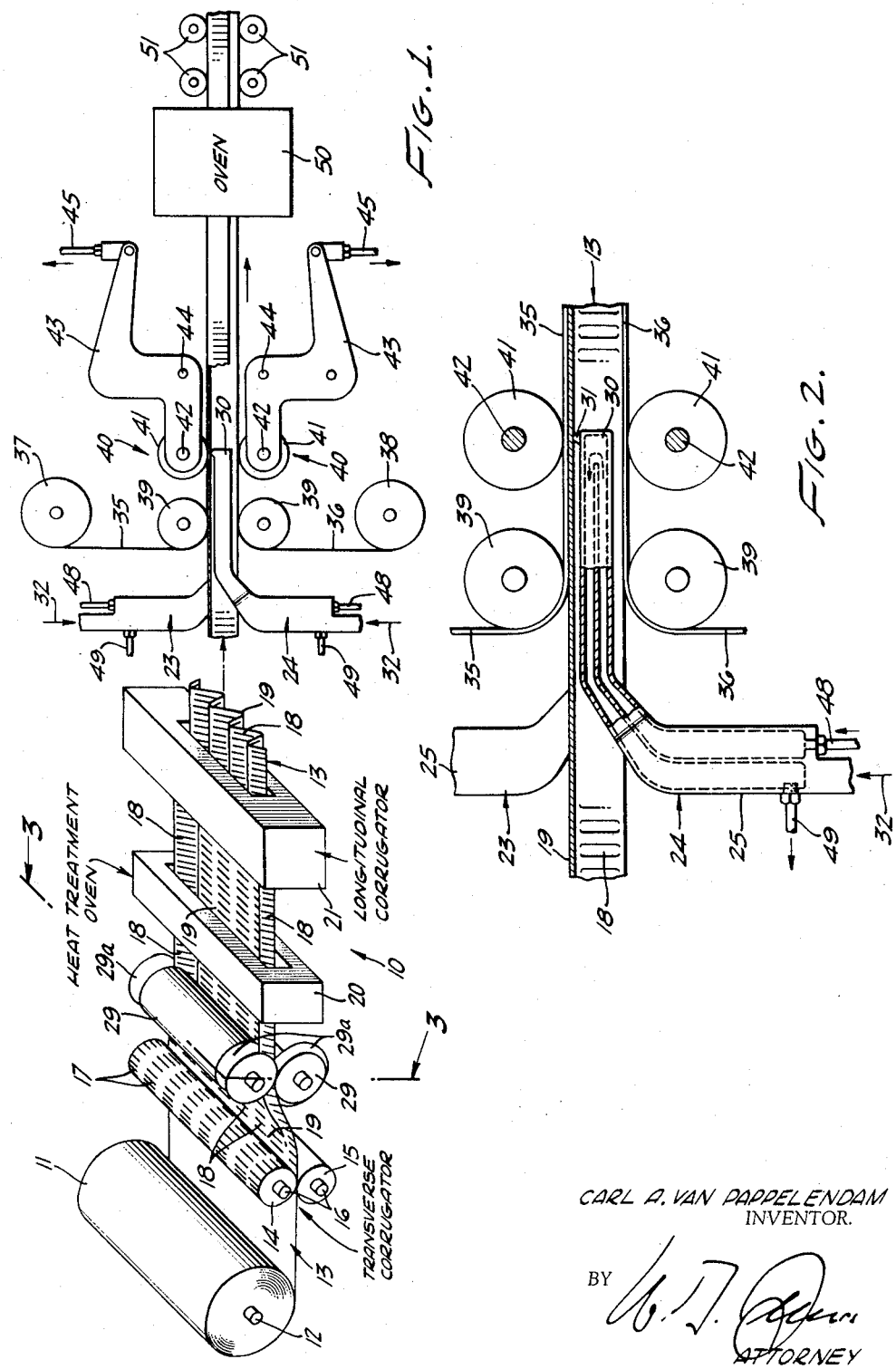

CARL A. VAN PAPPELENDAM
INVENTOR.

BY

ATTORNEY

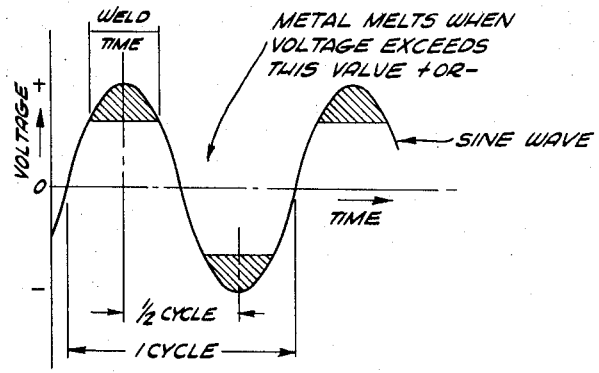
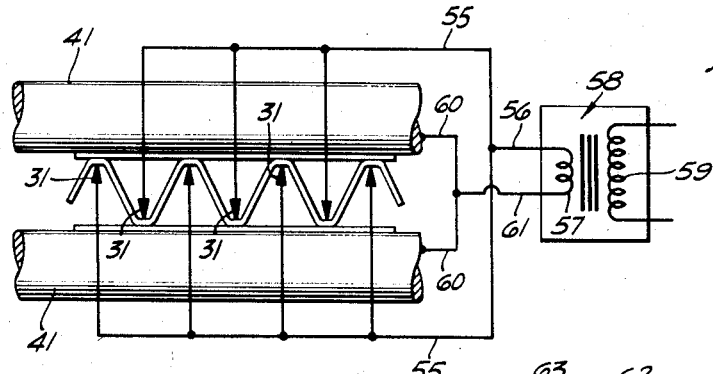
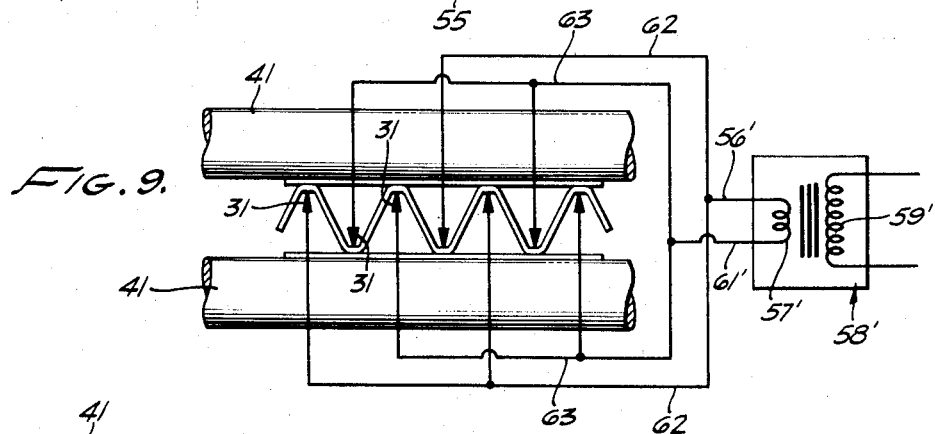
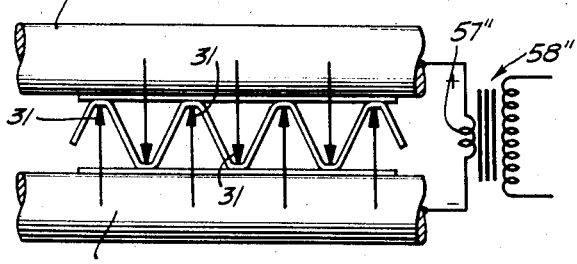
CARL A. VAN PAPPELENDAM
INVENTOR.

United States Patent Office

2,866,075
Patented Dec. 23, 1958

2,866,075

METHOD OF FABRICATING STRUCTURAL SANDWICHES

Carl A. Van Pappelendam, Rivera, Calif.

Application September 23, 1957, Serial No. 685,740

21 Claims. (Cl. 219—83)

The present invention relates to structural sandwiches and more particularly to an improved method of fabricating such sandwiches continuously from sheet metal utilizing new welding techniques for stitching the longitudinally corrugated core sheet to outer face sheets by rows of closely spaced spot weld.

This application is a continuation-in-part of my co-pending application for United States Letters Patent Serial No. 585,205, filed May 16, 1956, for Method of Fabricating Structural Sandwiches.

Laminated sandwich structures as heretofore provided have been formed from non-metallic materials and certain constructions have enjoyed wide spread use, as for example, corrugated paper sheeting of the type used in making shipping containers. The commercial success of such sheeting is due in large measure to high-strength fast-setting adhesives resistant to moisture and to the rapid and economic methods developed for manufacturing the sheeting in continuous lengths. Although these high-speed manufacturing techniques have been in wide scale use for many years, attempts to apply the skill of this art to the manufacture of cellular metal, though tried, have been fruitless owing to the many problems involved in trying to substitute metal for fibrous and non-metallic sheeting materials generally. To be commercially acceptable, a method of bonding the laminae together must be carried out speedily, at low cost, within very close quarters, and produce a uniform joint as strong as the sheet material and without weakening or disfiguring the material. Further, the joint must withstand mechanical and thermal shock, be unaffected by moisture or heat and be suitable for assembly from very thin sheets of metal.

Prior attempts to employ electric welding bonding techniques have been beset by many vexatious problems which seemingly were insurmountable with respect to the welding of cellular structures of one-half inch or less in thickness. Experience has shown that the obstacles to success increase sharply as the thickness of the finished product decreases below one-half inch. These obstacles have included such serious ones as mounting suitable electrodes within continuously advancing cellular structures, obtaining the required welding pressure between the electrodes, cooling the electrodes, controlling the welding current to obtain uniform high-strength welds without damaging adjacent areas of the sheeting, preventing buckling, warping, and distortion of the sheet material, holding the sheets of material and electrodes properly spaced, and maintaining all sheets properly and uniformly stressed during welding to the end that all areas of all components will be substantially uniformly stressed and capable of sustaining a load equitably. Desirably for high-speed welding, the welding pressure between electrode pairs can be of the order of 15 thousand pounds per square inch or higher and the problem of providing such pressures within corrugated core sheets of shallow dimensions was found to have its discouraging aspects. No less serious was the problem of handling the required high current flows and the application of these to the product being fabricated.

The foregoing and other problems are successfully solved by the present invention in the manner outlined generally in the aforementioned co-pending application and as benefically supplemented in numerous additional respects to be disclosed hereinbelow. In brief, the improved method of making lightweight cellular sandwiches from high-density material prestiffened against buckling and adapted to be mass-produced continuously in sheets of any length comprises feeding a core sheet through both transverse and longitudinal corrugating operations, a first heat treating operation, a welding operation and then through a final heat treating operation. The welding operation is especially important and, preferably is one in which closely spaced spot welds are formed automatically to stitch-fuse the face sheets to the longitudinal crests of the core sheet corrugations. The spacing of the stitches or spot welds is a function of the frequency of the alternating current power supply or of the intermittent or non-uniform nature of a direct current power supply and of the rate of feed past the electrodes. Preferably, but not necessarily, a greater pressure is applied to the outer electrodes than is used against the opposing inner electrodes in order to utilize advantageously the supporting strength of the core sheet as well as to use the inner electrodes to support the core sheet from pressures applied outwardly through the bottom of the longitudinal corrugations.

Accordingly, it is a primary object of the invention to provide an improved method of fabricating a cellular sandwich from thin sheet metal.

Another object is the provision of an improved method of continuously and automatically welding thin metal sheets together to form a high-strength cellular sandwich.

Another object is the provision of an improved method of economically mass-producing continuous high-density material into lightweight cellular sandwiches prestiffened against buckling and possessing great strength, bending stiffness and high heat insulating characteristics.

Another object of the invention is the provision of a method of welding a corrugated core sheet to exterior face sheets while holding the corrugated core sheet tensioned lengthwise thereof.

Another object of the invention is the improved method of welding corrugated core sheets to face sheets as such sheets are advanced under tension, and including utilization of such tension in cooperation with high pressure applied to internal electrodes seated against the bottoms of the corrugations to hold the electrodes against lateral displacement by flux field forces.

Still another object of the invention is the provision of a method for making a continuous cellular sandwich material from metal employing a transversely and longitudinally corrugated core sheet welded to opposed facing sheets and wherein the core sheet is heat treated before being welded to the face sheets and wherein the completed assembly is heat treated while under longitudinal tension.

These and other more specific objects will appear upon reading the following specification and claims and upon considering in connection therewith the attached drawings to which they relate.

Referring now to the drawings in which a preferred embodiment of the invention is illustrated:

Figure 1 is a diagrammatic view partially in perspective and partially in side elevation illustrating generally the consecutively performed processing operations constituting the present method for fabricating structural sandwich material;

Figure 2 is a fragmentary side elevational view on an enlarged scale showing the welding operation;

Figure 7 shows the sinusoidal voltage wave of the alternating current employed to energize the welding electrodes;

Figure 8 is a schematic diagram showing one way in which the electrodes may be energized;

Figure 9 is a similar schematic diagram of a second mode of energizing the welding electrodes;

Figure 10 is a schematic diagram of a third mode of energizing the welding electrodes.

Figure 4:
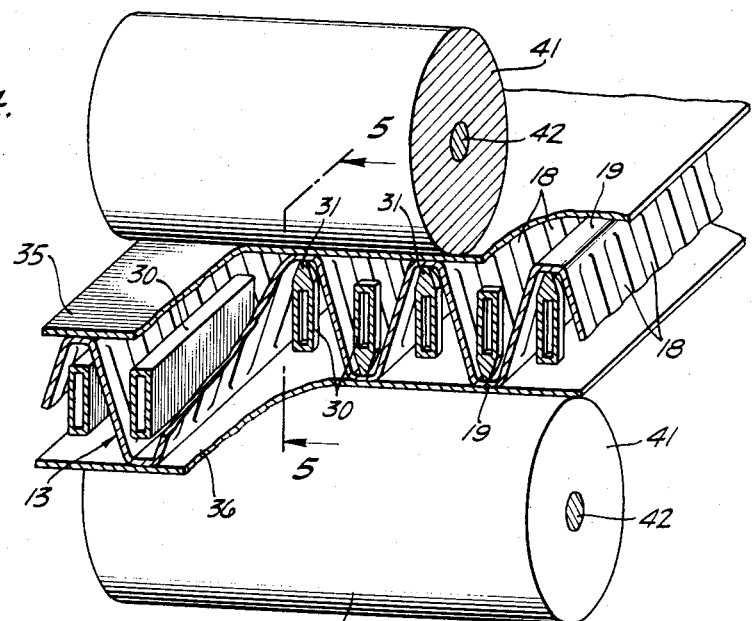
Figure 4 is a fragmentary view in perspective on an enlarged scale showing the forward end of the internal electrodes in relation to the corrugated core sheet.

While the present invention is susceptible of being carried out by hand utilizing a source of welding current, economical mass-production considerations make it desirable to utilize simple apparatus suitably arranged to perform the several manipulative steps sequentially. Accordingly, a typical arrangement of the essential apparatus found useful for these purposes is illustrated schematically in Figure 1 and designated generally 10. Owing to the fact that the central or core sheet of the sandwich structure is gathered crosswise thereof into longitudinal corrugations, it is essential that the supply roll 11 of flat sheet metal stock for this core be considerably wider than the width of the fabricated sandwich. Supply roll 11 is supported on a mandrel 12 and the sheet metal 13 issuing therefrom passes through a pair of complementarily shaped corrugating rolls 14 and 15 mounted on mandrels 16 and are suitably pressed together to corrugate sheet 13 transversely thereof. For this purpose each of rolls 14 and 15 is provided with axially spaced rows of shallow corrugating shapes 17 cooperating to form laterally spaced rows 18 of shallow corrugations separated from one another by flat non-corrugated strips 19. It will be understood that individual ones of the corrugations making up rows 18 have their ends gradually merging with the flat strips 19 and that the depth of the individual corrugations being as deep as space and other factors permit and may be, for example, one-eighth of the final core height or the distance between the face sheets. In thin sandwich structures the size of the inner electrodes is a limiting factor on the depth of the transverse corrugations.

Figure 3:
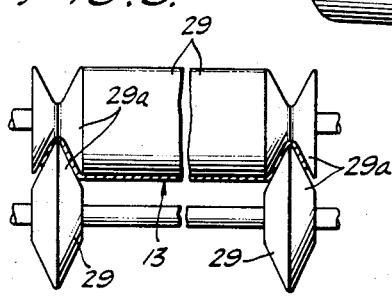
Figure 3 is a vertical sectional view taken on line 3—3 of Figure 1.
Figure 5:
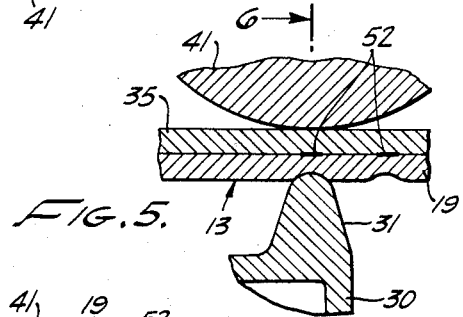
Figure 5 is a fragmentary sectional view on a greatly enlarged scale taken on line 5—5 of Figure 4.
Figure 11:
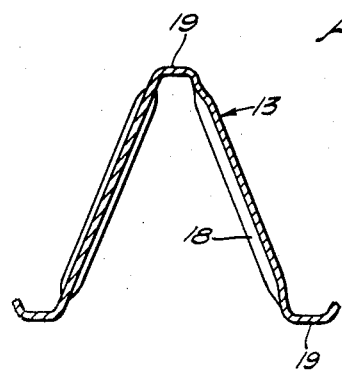
Figure 11 is a fragmentary transverse sectional view on an enlarged scale through a single one of the longitudinal corrugations.
Figure 6:
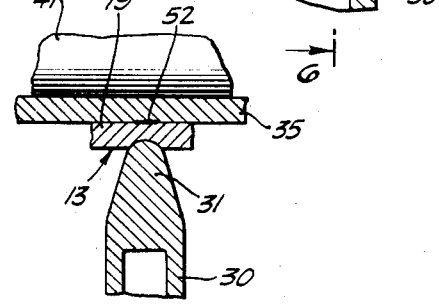
Figure 6 is a cross-sectional view taken on line 6—6 of Figure 5.

Preferably sheet 13 passes between a pair of rollers 29, 29 having a pair of mating flanges and grooves 29a at their opposite ends so positioned as to form the outer ones of the longitudinal corrugations 18 prior to the formation of the intermediate ones of these corrugations. As is clearly shown in Figures 1, 3 and 4 the outer longitudinal corrugations include an outer partial side wall which is of very considerable importance in the subsequent processing of the sheet and of the cellular structure. For example, the trough so provided aids in controlling the feed of the core sheet through the following steps and permits the sheet to be gripped and firmly held while the remaining longitudinal corrugations are being formed. Additionally and importantly, the partial corrugation or lip serves to hold the first and last ones of the inner electrodes accurately positioned for the welding operation as will be understood by reference to Figures 4, 8, 9 and 10.

Sheet 13, after passage through corrugating rollers 14 and 15, passes through a heat treatment oven 20 and then into a suitable longitudinal corrugator 21 which is effective to gather sheet 13 crosswise thereof to form all except the two outer longitudinal corrugations the crests of individual ones of which are formed by the non-corrugated flat strips 19 between transverse corrugations 18. Stated differently, individual corrugations have their side walls formed by a pair of adjacent strips of transverse corrugations 18 and the intervening crest formed by the narrow non-corrugated strip 19. From the foregoing it will be apparent that the core sheet 13 issuing from the longitudinal corrugator 21 is processed in readiness for assembly in a continuous manner between a pair of flat facing sheets, such continuous assembly including both advance from station to station either in a continuous or intermittent manner.

Before describing the mode of assembling the sandwich structure, it is desired to refer briefly to the materials used, their relative dimensions and certain other details of consequence. It will be understood that metals of various kinds and types may be employed and particularly those having high tensile strength, good working characteristics, resistance to corrosion and attack by gases and liquids, good heat insulating qualities and which are readily joined by electric welding. Although various metals meet these characteristics, stainless steel is particularly suitable and the particular values hereinafter stated are applicable when employing this material in very thin sheets to fabricate sandwich structures. In using the herein disclosed technique for making sandwich structures for application in aircraft and guided missiles and other structures of this nature the desired finished product may have a cross-sectional thickness in the range of $5/32$ to $3/16$ inch. However, it will be understood that the method can be utilized in making similar structures of either greater or lesser thickness. In a sandwich structure of approximately $5/32$ inch thickness using stainless steel sheeting, the core sheet preferably has a thickness of approximately 2 mils and the face sheets each have a thickness of approximately 6 mils. It is found that a structure made from type 301 stainless steel sheets of the described thickness is equivalent in weight to 17 mil thick solid sheet material, but has a bending stiffness as much as 235 times greater.

With the foregoing dimensions of the sheet stock in mind, the manner in which the face sheets are brought into assembly relation to the core sheet and then welded thereto by a continuous technique at either a uniform or non-uniform rate and forming an important aspect of the present invention will be disclosed. Although welding pressure requirements vary widely depending on many factors well known to persons skilled in this art, good results have been claimed using pressures of the order of magnitude of 30,000 pounds per square inch, this pressure being applied across the joint to be made between the crests of the longitudinal corrugations and the juxtaposed face sheets. The manner in which such pressures are generated interiorly of the corrugations by means of electrodes carrying the very high welding current will be described by reference to Figures 1 to 6. Referring first to Figure 2, it will be seen that the identical inner welding electrodes 23, 24 comprise hollow L-shaped members arranged alternately in two rows transversely of the core sheet with their shorter legs 25 projecting in opposite directions from the opposite sides of the core sheet, these legs being supported in such manner that a desired outwardly acting pressure can be applied to the bottoms of the longitudinal corrugations. The long narrow horizontally disposed legs 30 of the electrodes extend parallel to one another. Projecting from the ends of legs 30 in a direction opposite to supporting legs 25 is a welding tip 31, the ends of which are accurately ground to the same size and which tips support the core sheet in a horizontal plane by pressure applied to the bottom of each corrugation 18. The area of the tips as used in making a $5/32$ inch sandwich of the above described sheets of stainless steel was 0.000176 square inch.

The ends of electrode legs 25 connect with means (not shown) for applying known loads to the welding tips 31, such loads acting in opposite directions on adjacent electrodes as is indicated by the arrows 32. Accordingly, the applied load acts to force the welding tips 31 against the interior bottom portions of the corrugation with the result that the crests of adjacent corrugations are supported in spaced parallel planes. It follows that the core sheet is supported horizontally with the side wall portions of the corrugations held taut and uniformly spaced transversely of the core sheet.

The exterior face sheets 35 and 36 are supplied from continuous rolls 37 and 38, the webs from these rolls being pressed against the opposite sides of core sheet 13 by means of guide rolls 39 suitably supported opposite one another at a point slightly upstream of welding electrode 40. The exterior welding electrodes generally indicated at 40 may comprise separate, individually loaded and positioned electrodes for each weld row. As here shown by way of illustration, the external electrodes may be of any suitable construction, as for example, one upper and one lower metal roller 41 mounted on shafts 42 having their ends journaled in L-shaped supporting brackets 43 suitably supported as by trunnions 44. Linkages 45 for upper roller are attached to a fixed point and for lower roller to counterweights or other adjustable means for pressing the electrode rollers 41 against the outer surfaces of face plates 35 and 36 at points directly opposite welding tips 31 of the interior electrodes. By adjusting tension in lower linkages 45 a desired pressure can be applied to the opposite sides of the sandwich structure found most effective in electrically fusing the contacting faces of the core sheet and face sheets together. By adjusting upper linkages 45 correct vertical location of rollers can be obtained.

As stated above, it is important to maintain the face sheets in firm contact with the crests of the longitudinal corrugations in a plane transversely of the direction of travel during the welding operation. The pressure applied to the outer electrodes may vary from that barely producing contact of the face sheets with the core crests to that almost crushing the core without materially affecting the pressure applied at tips 31 of inner electrodes 23, 24. This wide range tolerance characteristic of the electrode loading system is of great importance in allowing for minor variations in the core height.

A desired high welding pressure between the abutting faces of the corrugations and of the face sheets of 125,000 p. s. i. or more is attainable despite the small working quarters provided interiorly of individual corrugations of the sandwich structure by reason of the minute area of welding tips 31 in contact with the bottoms of the corrugations. It is pointed out that the desired welding pressures vary in accordance with such factors as the kind of material, its thickness, surface finish, and others. When welding very thin bright finished stainless steel, a pressure of 30,000 p. s. i. is found to give good results.

The very high welding current employed in the welding operation makes it desirable if not mandatory to cool the electrodes. A blast of cooling air applied across the relatively large exterior electrodes is quite adequate but it is desirable to cool the inner electrodes 23, 24 by circulating cooling water through their hollow interiors. Cooling water may be supplied to the latter through conduit 48, this conduit preferably extending through the hollow vertical legs and discharging forwardly into the horizontal legs 30. The heated water is withdrawn from the electrodes through a conduit 49 communicating with the interior close to the ends of the vertical legs as is indicated in Figure 2.

Suitable means for advancing the sandwich structure through the various operations and past the welding station is provided, the finished structure being advanced under tension through the final heat treating oven 50 and between sets of drive rollers 51 serving additionally to hold the structure flat until it has cooled.

Reference will now be had to Figures 7, 8, 9 and 10 illustrating features of the important electric welding equipment and the different modes in which the welding current can be connected to the inner and outer electrodes. An important feature of the invention is the use of alternating current as the power supply for the electrodes in order that the changing voltage may be availed of to control time duration of current flow once a fusing temperature of the metal has been reached. Certain economies are available when using alternating power supply and for this reason as well as the simplicity of the illustration, different advantageous modes of using this type of power supply will be described. Other feasible power supplies include controlled pulse type of current provided by conventional welders of this type and direct current used to form either a continuous seam or a row of spot welds depending on the speed of advance of the material and other factors well known to persons skilled in this art.

Referring to Figure 7 there is shown graphically by way of example a 60 cycle sinusoidal alternating current having a peak voltage of about 1 volt and a peak current of about 200 amperes. Note that the crests of the waves are shaded to indicate that when the voltage reaches a value in the vicinity of 75% of peak voltage, sufficient current is flowing through the high pressure area of contact between welding tips 31 of the inner electrodes and the point of contact of the outer electrodes with the face sheets to fuse the contacting areas together over a small spot area indicated at 52 in Figures 5 and 6. This fusing temperature, together with the high pressures ranging between 25,000 and 125,000 p. s. i. forms a very strong but small area weld of the size indicated at 52 in Figures 5 and 6. Before the surrounding area of the contacting sheets can heat to fusing temperature, the voltage crest has receded and there is in insufficient current flow to fuse the metal, it being borne in mind that the sandwich is moving either steadily or intermittently past the electrodes. The foregoing factors account for the fact that a series of very small dots or elliptically shaped welds 52 are formed along the crests of the longitudinal corrugations the distance between welds 52 being dependent on the speed of advance of the sandwich structure and the welding frequency. Sixty cycle power supply yields 7200 welds per minute. Accordingly, the welds can be located very close together or apart several times the diameters of individual welds depending upon the rate at which the sandwich structure is pulled past the welding electrodes.

The power supply may be connected to the electrodes in various ways but preferably in accordance with the principles of one of the three methods represented in Figures 8 to 10, it being understood that either single or multi-phase power supply may be used, or in the alternative, various types of current power supplies. Since single phase is simpler to illustrate it has been used in each of the three schematic circuits but certain economies and advantages can be gained by use of a three phase power supply. Accordingly, the latter is to be understood as coming within the scope of the present invention. In the Figure 8 circuit, the inner electrodes are connected by suitable heavy duty buses 55, 55 to one side 56 of the secondary 57 of a heavy duty step down transformer 58 having its primary coil 59 connected to a 60 cycle power supply. The outer or roller electrodes 41 are connected in parallel by heavy buses 60 connected through bus 61 with the other side of transformer secondary 57.

In Figure 9 a second mode of connecting the inner and outer electrodes is shown, it being noted that outer electrodes 41 have no direct connection with the power supply. Instead, the opposite sides 56', 61' of the transformer secondary 57' are connected to buses 62, 63 respectively. Note that the arrangement is such that the opposite sides of secondary 57' are connected to alternate ones of the downwardly facing welding tips 31 and that the opposite sides of secondary 57' are connected to alternate ones of the upwardly facing welding tips 31.

In Figure 10 the opposite ends of secondary 57'' are connected to outer electrodes 41, 41 mounted directly opposite one another on opposite sides of the sandwich structure. To be noted in particular is the fact that the current does not flow directly from the transformer secondary to the welding tips 31; instead the current flows between the outer electrodes by way of the metal sandwich structure. In this connection it will be apparent that the high pressures of 25,000 to 125,000 p. s. i. applied between the adjacent inner and outer electrodes is effective to confine the current flow largely to the high pressure contact areas, thereby causing the metal opposite these points to fuse and weld together.

Although no schematic diagrams have been given for use of other power supplies, it is to be understood that this can be done within the skill of the art modified as may be necessary to incorporate the principles outlined above in describing an alternating current power supply.

Summarizing, it has been found of extreme importance to weld both face sheets to the crests of the core sheet simultaneously and along transverse lines lying within substantially the same vertical plane extending crosswise of the direction of sandwich travel. Of importance too is the performance of the welding operation while the sandwich is held flat transversely thereof and under longitudinal tension. When the component sheets are welded together in this manner, it is found that the resulting product has a minimum tendency to buckle, warp and distort from the flat prewelded condition of these components. Furthermore, when so welded any internal stresses in the product are substantially balanced and easily removed in a stress relieving oven, particularly if this latter operation is carried out immediately following the welding operation and while the structure is rigidly suported in a flat plane under tension.

While the particular method of making electrically welded sheet metal sandwich structure herein shown and disclosed in detail is fully capable of attaining the objects and providing the advantages hereinabove stated, it is to be understood that they are merely illustrative of the presently preferred embodiments of the invention and that no limitations are intended to the details of construction or design herein shown other than as defined in the appended claims.

I claim:

1. That method of making a rigidly bonded cellular sandwich structure in continuous lengths which comprises, feeding a longitudinally corrugated continuous core sheet of thin metal past an electric bonding station, supporting said sheet at said bonding station with the crests of said corrugations in flat parallel planes by electrode means extending lengthwise into said corrugations from supporting points located rearwardly from the point of electrode contact with the interior trough portion of the corrugations, feeding continuous thin facing sheets of metal against the crests of said corrugations from the opposite sides of said corrugated core sheet, pressing said face sheets against said core sheet by external electrodes, maintaining pressures in the range of thousands of p. s. i. on the portions of said sheets located between the pointed ends of said inner electrodes and the juxtaposed outer electrodes while passing a high welding current therebetween momentarily until said sheets fuse together.

2. That method of electrically welding a thin continuous metal sheet to each of the opposite faces of a continuous longitudinally corrugated metal core sheet to form a relatively rigid sandwich a minor fraction of an inch thick which method comprises, continuously feeding a longitudinally corrugated thin metal core sheet flanked on its opposite sides by advancing thin metal facing sheets, pressing said facing sheets against the crests of said corrugations along a line extending transversely of the direction of advance by means of external electrodes, extending internal electrodes longitudinally into said corrugations from the supply end thereof and pressing the pointed advance end of alternate ones of said internal electrodes in opposite directions against the bottoms of the corrugation troughs along a line opposite said external electrodes, periodically passing current through said electrodes momentarily to fuse said face sheets to said corrugated core sheet, and maintaining the freshly welded section of said sandwich flat and under tension as it advances past said electrodes to keep the same from distorting and warping.

3. That method defined in claim 2 wherein said external electrodes are directly opposed to one another on opposite sides of said sandwich structure and wherein said internal electrodes are aligned with one another beneath said external electrodes whereby the heating of said three sheets as an incident to the welding operation occurs in a straight line transversely on the line of advance and while said sandwich structure is held flat and under longitudinal tension and while said core sheet is held against transverse curling.

4. That method defined in claim 2 wherein a transverse series of spot welds are formed simultaneously between said face sheets and the crests of the corrugations in contact therewith by exciting said electrodes with a non-regular power supply having a peak voltage substantially in excess of that required to fuse the two layers of metal positioned between opposed pairs of inner and outer electrodes, and wherein the voltage amplitude and the time duration of said voltage excess is sufficient only to provide a strongly fused weld and insufficient to heat adjacent areas of the metal to the annealing point.

5. That method of continuously electrically fuse-stitching thin metal face sheets to the crests of an intermediate longitudinally corrugated core sheet which method comprises, feeding said face sheets against the opposite sides of an advancing core sheet as the sheets approach a welding station, pressing a transverse row of welding electrodes against said sheets from directly opposed lines extending across said advancing sheets, inserting two sets of intermeshed but separate internal electrodes longitudinally into said corrugations with one set of alternate electrodes pressing outwardly against the bottoms of corrugation troughs and the other set of alternate electrodes pressing outwardly against the bottoms of the remaining corrugations and with the point of pressure between all pairs of opposed electrodes lying substantially in the same plane normal to the path of advance of said sheets, and means energizing all of said electrodes substantially simultaneously for a brief interval of sufficient duration to spot fuse said sheets together in a restricted area between each pair of electrodes while maintaining said plates pressed together and under steady tension lengthwise thereof.

6. The method defined in claim 5 wherein said electrodes are energized from an alternating current source of power such that the current density for a brief interval during maximum voltage conditions of individual cycles is sufficient to fuse high pressure contacting areas of the sheets together but is insufficient to fuse these areas together at lower voltage values, whereby the face sheets are spot welded to the crests of said corrugations at intervals the spacing of which is determined by the frequency of the power source and the speed at which said sheets are advanced past said electrodes.

7. The method defined in claim 5 characterized in that the outer ones of said electrodes are connected in parallel to one side of a non-regular power source and the two inner sets of electrodes are connected in parallel to the other side of said power source.

8. The method defined in claim 5 characterized in that one outer row of electrodes is connected to one side of a non-regular power source and the other outer row of electrodes is connected to the other side of the power source.

9. The method defined in claim 5 characterized in that alternate ones of the electrodes on one side of the core sheet are connected to the one side of the power source and alternate ones of the electrodes on the other side of the sheet are connected to the other side of the power source.

10. That method of making a continuous length of wide flat sandwich material from superimposed thin sheets of metal electrically fused together which comprises, feeding a long flat sheet of metal through a first corrugating station wherein a plurality of rows of shallow corrugations are formed in the sheet, said corrugations extending crosswise of the direction of advance with adjacent rows being separated by narrow strips of non-corrugated metal, corrugating said sheet lengthwise thereof to form generally V-shaped corrugations with the non-corrugated strips forming the crests and lying in parallel planes and said shallow transverse corrugations forming the side walls of the longitudinal corrugations, pressing advancing continuous flat sheets of metal to the opposite sides of said corrugated sheet, inserting internal electrodes lengthwise into each corrugation from the source end thereof with the pointed inner ends of the electrodes pressed against the flat bottom of the associated through, pressing external electrodes against the exterior side of said flat face sheets opposite the pointed ends of said internal electrodes to press the flat crest portions of said longitudinal corrugations against the face sheet under high localized pressure, and simultaneously passing a high density welding current between all pairs of said electrodes for the instant required to form a spot weld therebetween and while holding said advancing sandwich structure under tension.

11. That method defined in claim 10 wherein said internal electrodes are continually cooled by the circulating of a cooling fluid in heat exchange relation therewith.

12. That method defined in claim 10 wherein said spot welds are spaced closely adjacent one another in rows along the flat crests of said longitudinal corrugations.

13. The method defined in claim 10 characterized in that the electric power for energizing said electrodes is non-regular having a low voltage in the order of 1 volt and a high current density in the order of 200 amperes at the electrodes.

14. The method defined in claim 10 characterized in that the corrugated core sheet has a thickness of 1.5 to 5 mils and the face sheets have a thickness of 3 to 10 mils, and wherein the thickness of the finished product is less than one-half inch.

15. That method of continuously fabricating lightweight high-density cellular material pre-stiffened against buckling from an advancing longitudinally-corrugated core sheet and a pair of advancing flat face sheets on the opposite sides thereof, which method comprises, inserting movably supported electrodes lengthwise into each of said corrugations from the source end of said material with their pointed inner ends pressed outwardly against the bottoms of each of said longitudinal corrugations and under high pressure densities of the order of magnitude of 15,000 to 125,000 p. s. i., opposing these pressures by external electrodes pressing said face sheets against the crests of the core sheet corrugations, applying tension to assembled portions of said cellular material to advance the same through said pairs of opposed electrodes, and periodically and simultaneously passing a welding current between said pairs of electrodes to spot weld said face sheets to the crests of said core sheet corrugations while said sheets are tensioned lengthwise thereof and held rigidly against distortions or displacement transversely thereof.

16. That method defined in claim 15 characterized in that said spot welds are so closely spaced to one another as to form a fluid-tight joint between said face sheets and the crests of said corrugations.

17. That method of continuously fabricating high density material into a lightweight cellular sandwich having a high moment of inertia and great resistance to buckling which method comprises, advancing forwardly past a welding station a longitudinally corrugated core sheet each corrugation of which is provided with narrow flat crests and shallow transversely corrugated side walls, supporting said core sheet in transverse tension at said welding station by internal electrodes extending lengthwise into said corrugations from a rear support area, pressing the forward ends of alternate electrodes in opposite directions against the bottoms of the corrugations to support the core sheet in a flat plane, advancing relatively thick face sheets against the opposite sides of said core sheet, pressing said face sheets against the crests of the core sheet by the aid of external electrodes positioned directly opposite said pressure points, and momentarily passing an A. C. welding current simultaneously between each pair of said electrodes as said sheets of material advance therepast.

18. The method defined in claim 17 which includes periodically and automatically discontinuing said welding as the voltage of the said A. C. power source falls below that requisite to fuse together the contacting surfaces of said face and core sheets thereby producing a row of stitch-like welds along the crests of said longitudinal corrugations as the cellular material advances past the electrodes, and thereafter stress relieving the welded sandwich structure as the same is held flat and under tension.

19. The method defined in claim 17 wherein the welding current between adjacent pairs of welding electrodes flows in opposite directions while said face sheets are held flat and in longitudinal tension and said core sheet is maintained in transverse and longitudinal tension.

20. That method of continuously fabricating high density material into a lightweight cellular sandwich having a high moment of inertia and great resistance to buckling which method comprises, advancing forwardly past a welding station a longitudinally corrugated core sheet each corrugation of which is provided with narrow flat crests and shallow transversely corrugated side walls, supporting said core sheet in transverse tension at said welding station by internal electrodes extending lengthwise into said corrugations from a rear support area, pressing the forward ends of alternate electrodes in opposite directions against the bottoms of the corrugations to support the core sheet in a flat plane, advancing relatively thick face sheets against the opposite sides of said core sheet, pressing said face sheets against the crests of the core sheet by the aid of external electrodes positioned directly opposite said pressure points, and momentarily passing a continuous D. C. welding current simultaneously between each pair of said electrodes as said sheets of material advance therepast.

21. That improvement in the manufacture of continuous cellular sandwich structures from strips of sheet metal pressed against the opposite sides of a longitudinally corrugated core sheet which improvement comprises forming said core sheet with a longitudinal corrugation along either lateral edge thereof having a complete inner sidewall, a crest and at least a portion of an outer sidewall, and extending welding electrodes longitudinally of said corrugations toward the advancing end thereof while pressing the tip inner ends thereof outwardly against the bottom of each longitudinal corrugation in opposition to the feeding and pressing of strips of face sheets against the exterior of the corrugation crests, and electrically fusing said face sheets to said crests opposite the tips of said inner electrodes as said core and face sheets are advanced past said electrodes.

References Cited in the file of this patent
UNITED STATES PATENTS

| | | |
|---|---|---|
| 1,156,898 | Gravell | Oct. 19, 1915 |
| 1,885,294 | Robertson | Nov. 1, 1932 |
| 2,278,791 | Lewis | Apr. 7, 1942 |
| 2,324,435 | Smith | July 13, 1943 |

UNITED STATES PATENT OFFICE

CERTIFICATE OF CORRECTION

Patent No. 2,866,075 December 23, 1958

Carl A. Van Pappelendam

It is hereby certified that error appears in the printed specification of the above numbered patent requiring correction and that the said Letters Patent should read as corrected below.

Column 9, line 20, for "through" read -- trough --.

Signed and sealed this 17th day of March 1959.

(SEAL)
Attest:

KARL H. AXLINE
Attesting Officer

ROBERT C. WATSON
Commissioner of Patents